Aug. 21, 1951 C. B. DOTY 2,565,211
ARMREST
Filed June 10, 1947 2 Sheets-Sheet 1
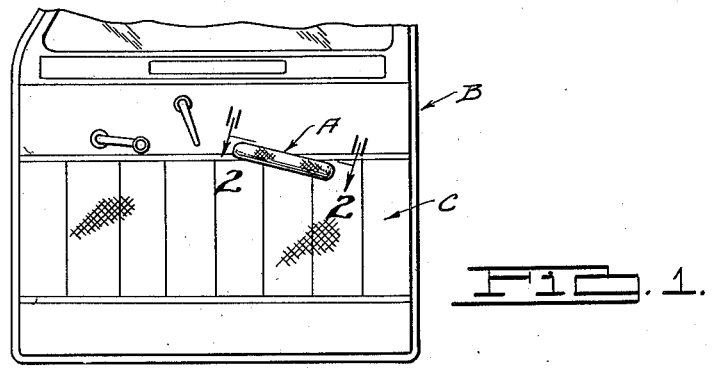
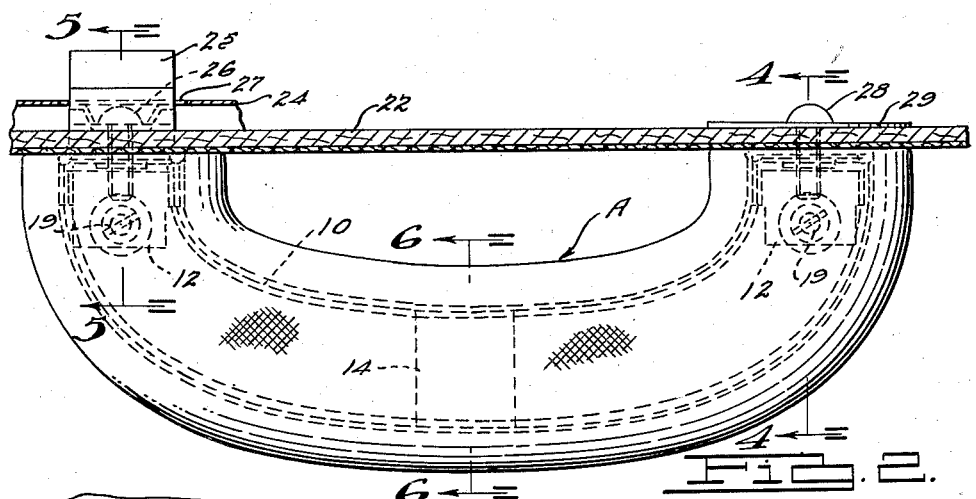
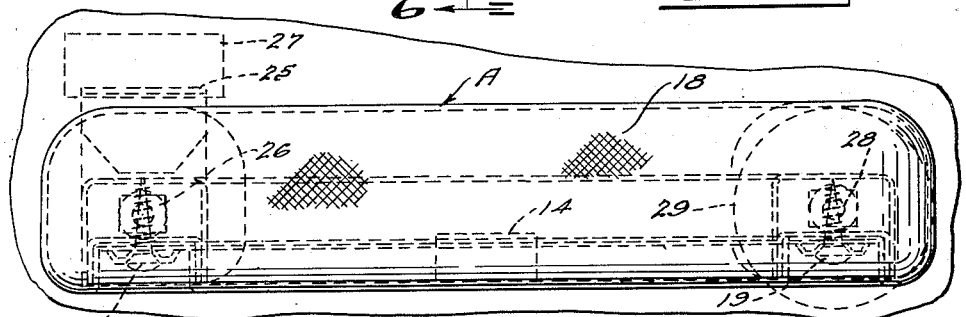
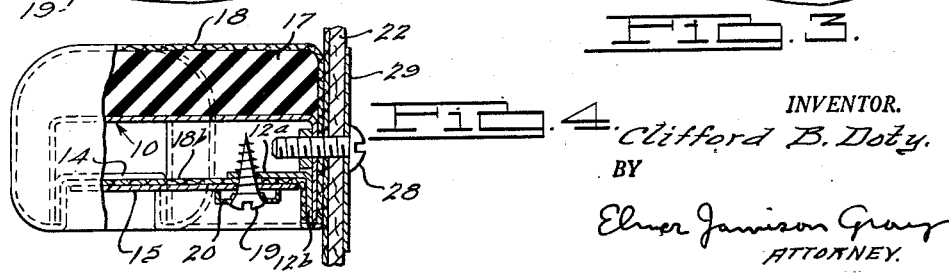
INVENTOR.
Clifford B. Doty.
BY
Elmer Jamison Gray
ATTORNEY.

Aug. 21, 1951 — C. B. DOTY — 2,565,211
ARMREST
Filed June 10, 1947 — 2 Sheets-Sheet 2
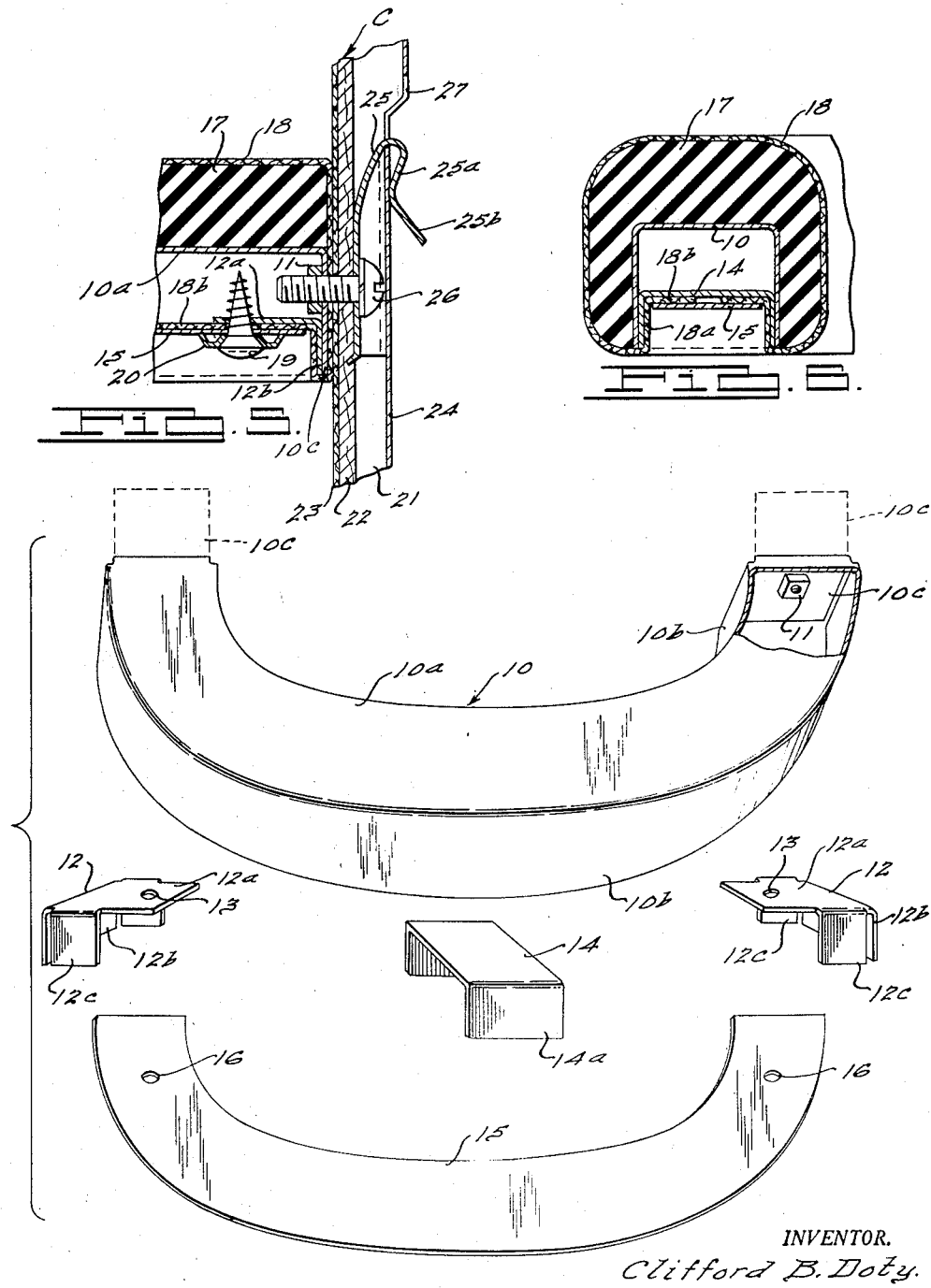
INVENTOR.
Clifford B. Doty.
BY
Elmer Jamison Gray
ATTORNEY.

Patented Aug. 21, 1951

2,565,211

UNITED STATES PATENT OFFICE 2,565,211

ARMREST

Clifford B. Doty, Detroit, Mich., assignor to Briggs Manufacturing Company, Detroit, Mich., a corporation of Michigan Application June 10, 1947, Serial No. 753,665

10 Claims. (Cl. 155—198)

This invention relates to arm rests for vehicle bodies and in particular to arm rests adapted to be attached to the doors of automobile bodies, such as the front doors. An arm rest constructed in accordance with a preferred embodiment of the invention provides not only a convenient and comfortable rest for the arm of the car passenger or driver but also a hand grip member capable of being readily grasped to pull the door closed.

An object of the invention is to provide an arm rest having a frame of improved construction for supporting the padding and upholstery material, such frame being fabricated principally from a number of component stamped or pressed metal parts which may be economically manufactured and easily assembled to provide a strong and rigid hollow frame.

A further object of the invention is to provide an improved arm rest shaped to form a hand grip and comprising a hollow frame formed from an inverted channel shaped stamping insertable into a correspondingly shaped channel or recess in a rubber or other cushion pad, the latter in the assembled structure being covered with fabric or other upholstery material, and the arm rest being provided with improved means for retaining the fabric in taut condition around the cushion pad and frame, thus producing an arm rest of simple construction, neat and attractive in appearance and in which the component parts are capable of being easily and inexpensively assembled.

Still a further object of the invention is to provide an arm rest comprising a padded, fabric covered downwardly opening channel-shaped frame and improved means for attaching opposite ends of the frame to the vehicle door. In accordance with the preferred embodiment of the invention the ends of the arm rest are mounted upon and attached through concealed means directly to the inner trim panel of the door, the attaching means for one end, such as the front end, of the arm rest, however, including a device by means of which the arm rest may also be directly and releasably attached to the inner metal door panel. As a result of this improved construction the pull on the arm rest, when it is grasped to pull the door closed, is largely transmitted directly to the metal door panel since the releasable concealed attaching means at one end of the arm rest provides also a rigid connection between the trim panel and door panel.

Other objects of this invention will appear in the following description and appended claims, reference being had to the accompanying drawings forming a part of this specification wherein like reference characters designate corresponding parts in the several views.

Fig. 1 is a fragmentary inside elevation of the front door of an automobile body having attached thereto an arm rest constructed in accordance with one embodiment of the invention.

Fig. 2 is an enlarged view, partly in section, taken through lines 2—2 of Fig. 1 looking in the direction of the arrows.

Fig. 3 is a front elevation of the arm rest shown in Fig. 2.

Fig. 4 is a section taken substantially through lines 4—4 of Fig. 2 looking in the direction of the arrows.

Fig. 5 is a section taken substantially through lines 5—5 of Fig. 2 looking in the direction of the arrows.

Fig. 6 is a section taken substantially through lines 6—6 of Fig. 2 looking in the direction of the arrows.

Fig. 7 is an exploded view in perspective illustrating the component parts of the arm rest frame.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

There is illustrated in the drawings, by way of example, an arm rest A constructed in accordance with one embodiment of the present invention and adapted to be attached to the inside of a vehicle door, such as the front door B of an automobile body. The arm rest of the present invention comprises a fabric covered padded metal frame structure including a downwardly opening or inverted channel-shaped frame member which, together with other component parts of the frame structure, is fabricated from sheet metal, as illustrated in Fig. 7. The main frame member 10 of the arm rest is stamped or otherwise formed into a curved channel which is bowed inwardly of the door so as to enable the arm rest to serve the purposes of both an arm rest and a hand grip. This frame member comprises a top web 10a and correspondingly curved depending flanges 10b. In forming the frame member the top web 10a is provided at opposite ends with extensions 10c which are bent down from the dotted line positions of Fig. 7 to the full line positions so as to provide end pieces which approximately close the ends of the channel. Secured to each end piece 10c, such as by spot welding, is a nut 11 which has a threaded hole registering with a hole pierced in the end piece.

Mounted within each end of the channel member 10 is an angularly shaped retainer piece 12. This piece is stamped to provide a top flange 12a, a depending end flange 12b, and depending side flanges 12c. Each retainer piece 12 is also pierced to provide a hole 13 in the top flange 12a thereof. As shown in Figs. 4 and 5, each retainer piece is assembled within an end of the channel 10 immediately beneath the nut 11. The flange 12b is spot welded to the end piece 10c and the side flanges 12c, which are curved to conform to the curvature of the flanges 10b, are spot welded thereto. It will be noted that the lower edges of the flanges 12b and 12c of the retainer pieces 12 terminate flush with the lower edges of the flanges 10b and end members 10c of the channel 10. Interposed between the side flanges 10b of the frame member is a channel brace or tie piece 14 provided with depending flanges 14a abutting against the inner surfaces of the flanges 10b and spot welded thereto. The channel brace 14 is located centrally of the frame member 10 and the side flanges 14a are preferably curved to conform to the curvature of the side walls or flanges 10b of the channel member. The lower edges of the flanges 14a of the tie piece or channel brace 14 terminate flush with the lower edges of the flanges 10b, as shown in Fig. 6, and the top web of this brace lies in the same plane as the top webs 12a of the retainer pieces 12. With this construction the top portions of the retainer pieces 12 and tie piece 14 provide abutments against which the fabric trim material for the arm rest may be clamped through the medium of a clamping plate 15, this plate being blanked out so as to have a width such as to permit the plate to be inserted between the side flanges or wings 12c of the retainer pieces and between the side flanges 14a of the tie piece 14. The clamping plate 15 is pierced at opposite ends to provide holes 16 adapted to register with the holes 13 in the retainer pieces.

The top and sides of the arm rest are cushioned by means of a pad 17 which is preferably formed of sponge rubber. This pad extends the full length of the arm rest frame member 10 and has a corresponding longitudinal curvature. The pad is molded with a longitudinal channel or recess to receive the frame member 10, as shown in Fig. 6. Thus, in assembling the arm rest the rubber pad 17 is fitted over the channel member 10 so as to entirely house the same. Thereafter the pad is covered by means of fabric material 18. This material is drawn tightly around the padded frame as shown at 18a and the edge portions 18b of the fabric are pushed up into the open bottom of the channel member 10 against the top webs of the members 12 and 14. With the fabric thus assembled around the arm rest the clamping plate 15 is forced upwardly within the channel to the position shown in Fig. 6, thus clamping the edges of the fabric against the members 12 and 14. The clamping plate is then rigidly secured in position by means of screws 19 which extend through the registering holes 13 and 16 with the threads of the screws engaging the edges of these holes so as to anchor these screws in place. The heads of the screws 19 engage countersunk holes in clinch washers 20, see Figs. 4 and 5.

The arm rest, as preferably constructed in the above manner, is attached to the inner removable door trim panel C which in turn is attached in the usual manner by fastener devices to the inner metal door panel 21, see Figs. 2 and 5. The inside trim panel C, which covers the metal door panel 21, may be of any conventional construction comprising, for example, a foundation board 22 of fibrous material to which is cemented a fabric or other ornamental covering 23. Mounted against the back side of the foundation board 22 at one end thereof is an attaching plate or bar 25 which is secured to the trim panel and also to the end of the arm rest through the medium of a screw 26. The threaded shank of the screw is inserted through aligned holes in the attaching member 25 and trim panel and is threaded into the nut 11 at the corresponding end of the arm rest. At the locality of the head of the screw 26 the inner metal door panel 21 is embossed outwardly at 24. The attaching member 25 at its upper end has a spring hook 25a terminating in an outwardly and downwardly inclined pilot extension 25b. In attaching the upper end of the hooked member 25 to the inner door panel 21 the pilot portion 25b is inserted through an aperture 27 in the embossed portion 24 of the panel, and the hook 25a is drawn down tightly so as to grip the portion of the metal of the panel below the aperture 27. Thus, one end of the arm rest is installed with the trim panel C upon the inner metal door panel 21 by inserting the hook 25a through the aperture 27 and then forcing the panel downwardly to clamp it into position.

The opposite or rear end of the arm rest is attached directly to the trim panel C in the manner shown in Fig. 4. This is accomplished by means of a screw 28 passing through the trim panel and threaded into the nut 11 at the rear end of the arm rest. The head of the screw 28 engages a large flat washer 29.

From the foregoing it will, therefore, be seen that when the arm rest is installed on the door the forward end thereof, as shown in Fig. 5, is attached both to the trim panel C as well as to the inner metal door panel 21 whereas the rear end of the arm rest, as shown in Fig. 4, is only attached directly to the trim panel. It will be understood that the arm rest is first mounted upon the trim panel in the manner shown in Figs. 4 and 5, and when the trim panel is installed on the door through the usual spring snap fasteners the hooked member 25 is also connected in position on the inner metal door panel 21 in the manner shown in Fig. 5. Since the arm rest in accordance with the present embodiment of the invention not only presents an attractive appearance but is also relatively simple in construction, being composed of a minimum number of inexpensive stamped parts, considerable savings in the cost of construction and assembling of the component parts are achieved by virtue of the invention. Furthermore, as a result of the improved construction a very strong mounting for the arm rest on the door is provided since the pull on the arm rest, when it is used to pull the door closed, is largely transmitted through the front end of the arm rest directly to the metal door panel, this being due to the rigid connection through the medium of the hooked member 25 of the forward end of the arm rest frame 10 to the inner metal door panel.

I claim:

1. An arm rest for a vehicle body, comprising a longitudinally curved downwardly opening channel shaped frame, a cushion pad fitting over said frame, retainer members secured within the ends of said frame, fabric material covering said pad and frame, and means fitting into the channel of said frame for clamping edge portions of said material against said members.

2. An arm rest for a vehicle body, comprising a longitudinally curved downwardly opening channel shaped frame, a cushion pad fitting over said frame, retainer members secured within the ends of said frame, fabric material covering said pad and frame, a clamping plate fitting into the channel of said frame for clamping edge portions of said material against said retainer members, and devices for rigidly securing said plate to said retainer members.

3. An arm rest for a vehicle body, comprising a longitudinally curved downwardly opening channel shaped frame, a cushion pad fitting over said frame, retainer members secured within the ends of said frame, a channel shaped brace member interposed between the side walls of said frame intermediate the ends thereof, fabric material covering said pad and frame, and means for clamping edge portions of said material against said members within the channel of said frame.

4. An arm rest for a vehicle body, comprising a longitudinally curved downwardly opening channel shaped frame, a cushion pad fitting over said frame, retainer members secured within the ends of said frame, a channel shaped brace member interposed between the side walls of said frame intermediate the ends thereof, fabric material covering said pad and frame, a clamping plate fitting into the channel of said frame for clamping portions of said material against said retainer and brace members, and devices accessible beneath the frame for securing said plate to certain of said members.

5. An arm rest for the door of a vehicle body, comprising a downwardly opening channel frame shaped to provide an arm rest and hand grip, the open ends of said frame having end pieces joined thereto, retainer members secured within the ends of the frame to said end pieces and to the side walls of the frame, a cushion pad fitting over said frame, fabric material covering said pad and frame, and means for clamping portions of said material to said retainer members within the channel of the frame.

6. An arm rest for the door of a vehicle body, comprising a downwardly opening channel frame shaped to provide an arm rest and hand grip, the open ends of said frame having end pieces joined thereto, retainer members secured within the ends of the frame to said end pieces and to the side walls of the frame, a cushion pad fitting over said frame, fabric material covering said pad and frame, a clamping plate fitting into the channel of said frame for clamping edge portions of said material against said retainer members, and devices for rigidly securing said plate to said retainer members.

7. An arm rest for the door of a vehicle body, comprising a downwardly opening channel frame shaped to provide an arm rest and hand grip, the open ends of said frame having end pieces joined thereto, retainer members secured within the ends of the frame to said end pieces and to the side walls of the frame, a cushion pad fitting over said frame, fabric material covering said pad and frame, a brace member interposed between the side walls of said frame intermediate the ends thereof, and means for clamping portions of said material to said retainer and brace members within the channel of the frame.

8. An arm rest for the door of a vehicle body, comprising a downwardly opening longitudinally curved channel frame having a top web and spaced depending side walls, said web having downwardly bent extensions at opposite ends forming end pieces, retainer members secured within the ends of the frame to said end pieces and to the side walls of the frame, a cushion pad fitting over said frame, fabric material covering the pad and frame, and means secured within the channel of the frame to said retainer members for clamping said material to the retainer members.

9. In an arm rest attachable to a vehicle door having an inner metal door panel and a trim panel detachably connected thereto, a channel shaped frame having spaced side walls shaped to provide a hand grip, said frame having end portions engageable with said trim panel, a cushion pad supported on the frame, a hook-like member adapted to be attached to one of said end portions and to said trim panel and adapted to engage in an aperture in said door panel, and means for attaching the opposite end portion of said frame to said trim panel.

10. In an arm rest attachable to a vehicle door having an inner metal door panel and a trim panel detachably connected thereto, a channel shaped frame having spaced side walls shaped to provide a hand grip, said frame having end portions engageable with said trim panel, a cushion pad supported on the frame, an attaching member secured to one of said end portions and adapted to lie at the outer side of the trim panel and attachable to the inner metal door panel, and means for attaching the opposite end portion to said trim panel in concealed position.

CLIFFORD B. DOTY.

REFERENCES CITED

The following references are of record in the file of this patent:

UNITED STATES PATENTS

| Number | Name | Date |
|---|---|---|
| 875,552 | McGee | Dec. 31, 1907 |
| 1,820,283 | Mills | Apr. 25, 1930 |
| 1,756,694 | Loehr | Apr. 29, 1930 |
| 2,203,413 | Hood | June 4, 1940 |
| 2,325,292 | Westrope | July 27, 1943 |